US008044974B2

(12) United States Patent
Sumida et al.

(10) Patent No.: US 8,044,974 B2
(45) Date of Patent: Oct. 25, 2011

(54) IMAGE CREATING APPARATUS AND IMAGE CREATING METHOD

(75) Inventors: Youichi Sumida, Kobe (JP); Takuma Watanabe, Kobe (JP); Ryuichiro Emi, Kakogawa (JP); Yohko Kawai, Tokyo (JP); Takayuki Mitsuhashi, Sagamihara (JP); Kiyoaki Watanabe, Tokyo (JP)

(73) Assignee: Sysmex Corporation, Kobe (JP)

( * ) Notice: Subject to any disclaimer, the term of this patent is extended or adjusted under 35 U.S.C. 154(b) by 336 days.

(21) Appl. No.: 11/408,833

(22) Filed: Apr. 20, 2006

(65) Prior Publication Data

US 2006/0239534 A1 Oct. 26, 2006

(30) Foreign Application Priority Data

Apr. 20, 2005 (JP) ................................ 2005-121774

(51) Int. Cl.
*G09G 5/00* (2006.01)

(52) U.S. Cl. ........ 345/629; 345/617; 382/133; 382/134; 382/255

(58) Field of Classification Search .................... 607/89; 348/79; 382/284
See application file for complete search history.

(56) References Cited

U.S. PATENT DOCUMENTS 5,644,388 A * 7/1997 Maekawa et al. ............... 356/73
6,956,582 B2 * 10/2005 Tidwell ......................... 345/611
2002/0069221 A1 * 6/2002 Rao et al. ...................... 707/509
2002/0177885 A1 * 11/2002 Eisfeld et al. .................. 607/89
2003/0112330 A1 6/2003 Yuri et al.
2004/0057094 A1 * 3/2004 Olszak et al. ................. 359/198
2004/0062454 A1 * 4/2004 Komiya et al. ............... 345/629
2004/0095472 A1 * 5/2004 Yoshida et al. .......... 348/208.12
2004/0167806 A1 * 8/2004 Eichhorn et al. .................. 705/3
2004/0196365 A1 * 10/2004 Green et al. ..................... 348/79
2005/0047640 A1 * 3/2005 Eisfeld et al. ................. 382/133
2006/0045338 A1 * 3/2006 Recht ............................ 382/181
2006/0050948 A1 3/2006 Sumida et al.
2006/0170907 A1 * 8/2006 Tuschel .......................... 356/73
2006/0257013 A1 * 11/2006 Ramm et al. .................. 382/133
2008/0123922 A1 * 5/2008 Gielen et al. .................. 382/131

FOREIGN PATENT DOCUMENTS

JP 06-003600 1/1994
JP 09-281405 10/1997
JP 2003-248176 9/2003
JP 2004-150895 5/2004
JP 2005-283376 10/2005
JP 2006-49964 2/2006

* cited by examiner

*Primary Examiner* — Xiao Wu
*Assistant Examiner* — Phi Hoang
(74) *Attorney, Agent, or Firm* — Brink Hofer Gilson & Lione

(57) ABSTRACT

An image creating apparatus capable of creating cell images allowing reliable determination of cell structures in a cell is provided. This image creating apparatus comprises an image pickup portion picking up a plurality of images of a cell on different focal positions and an image synthesizing portion classifying the plurality of images picked up by the image pickup portion into a plurality of depth ranges as to the focal direction and synthesizing the plurality of images belonging to the respective ones of the plurality of depth ranges every plurality of depth ranges thereby creating focus-synthesized images in focus over corresponding depth ranges every plurality of depth ranges.

16 Claims, 13 Drawing Sheets

VIRTUAL SLIDE DIVISION FLOW

IMAGE CREATING APPARATUS AND IMAGE CREATING METHOD

This application claims priority under 35 U.S.C. §119 to Japanese Patent Application No. 2005-121774 filed Apr. 20, 2005, the entire content of which is hereby incorporated by reference.

BACKGROUND OF THE INVENTION

1. Field of the Invention

The present invention relates to an image creating apparatus and an image creating method, and more particularly, it relates to an image creating apparatus and an image creating method for creating cell images.

2. Description of the Background Art

An image creating apparatus picking up images of a cell on a plurality of different depth-directional positions of the cell thereby creating cell images corresponding to the plurality of different depth-directional positions of the cell respectively is known in general, as disclosed in Japanese Patent Laying-Open No. 2004-150895, for example.

The aforementioned Japanese Patent Laying-Open No. 2004-150895 discloses an image creating apparatus including three line sensors so arranged that depth-directional focal positions with respect to a cell to be tested are different from each other. The conventional image creating apparatus disclosed in Japanese Patent Laying-Open No. 2004-150895 can create three cell images corresponding to the respective ones of three different depth-directional positions of the cell, fixedly set in advance, by picking up images of the cell in focus on the three different depth-directional positions of the cell respectively.

However, the conventional image creating apparatus disclosed in the aforementioned Japanese Patent Laying-Open No. 2004-150895, picking up the images of the cell on the three different depth-directional positions of the cell fixedly set in advance respectively, cannot obtain focused images as to cell structures distributed in positions other than these focal positions. Consequently, it may be difficult to determine the cell structures in the cell when the cell structures are tested through cell images in the aforementioned Japanese Patent Laying-Open No. 2004-150895.

SUMMARY OF THE INVENTION

The present invention has been proposed in order to solve the aforementioned problem, and an object of the present invention is to provide an image creating apparatus capable of creating cell images allowing reliable determination of cell structures in a cell.

Another object of the present invention is to provide an image creating method capable of creating cell images allowing reliable determination of cell structures in a cell.

In order to attain the aforementioned objects, an image creating apparatus according to a first aspect of the present invention comprises an image pickup portion picking up a plurality of images of a cell on different focal positions and an image synthesizing portion classifying the plurality of images picked up by the image pickup portion into a plurality of depth ranges as to the focal direction and synthesizing the plurality of images belonging to the respective ones of the plurality of depth ranges every plurality of depth ranges thereby creating focus-synthesized images in focus over the entire corresponding depth ranges every plurality of depth ranges. The term "focus synthesis" indicates processing of extracting pixels in focus from a plurality of images (identical field) having different focal positions respectively for creating an image (focus-synthesized image) entirely in focus.

An image creating method according to a second aspect of the present invention comprises steps of picking up a plurality of images of a cell on different focal positions and creating focus-synthesized images in focus over entire corresponding depth ranges every plurality of depth ranges by classifying the plurality of images into the plurality of depth ranges as to the focal direction and synthesizing the plurality of images belonging to the respective ones of the plurality of depth ranges every plurality of depth ranges.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the overall structure of a network system including an image creating apparatus 1 according to this embodiment is described with reference to FIGS. 1 to 5. Images created by the image creating apparatus 1 according to this embodiment are blood cell images (virtual slides).

Figure 1:
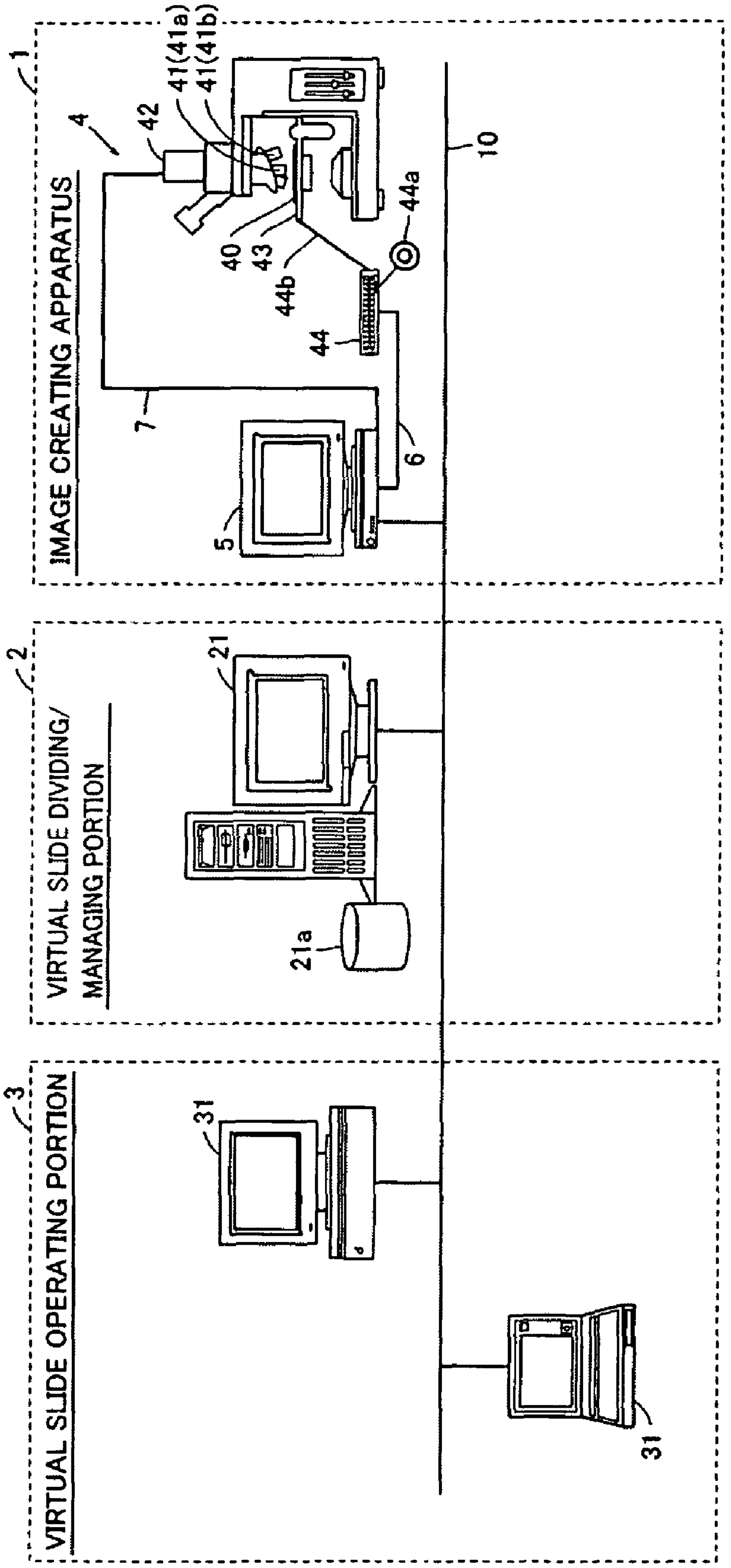
FIG. 1 illustrates the overall structure of a network system for transmitting data of images created by an image creating apparatus according to an embodiment of the present invention to a client terminal.

According to this embodiment, the image creating apparatus 1 is connected to a virtual slide dividing/managing portion 2 and a virtual slide operating portion 3 through a LAN cable 10 serving as a network cable, as shown in FIG. 1. The virtual slide dividing/managing portion 2 is provided with a server 21 for preserving virtual slide data and managing and image-dividing the virtual slide data. This server 21 has a database 21*a* storing a table associating identification information and attribute information with each other. The database 21*a* preserves the virtual slide data along with the identification information such as specimen numbers. The attribute information includes patient attribute information such as the serial number of a patient, his/her name, his/her sexuality, his/her age, his/her blood type, the ward in which the patient is put, the department in which the patient receives medical treatment, the name of his/her disease, his/her anamnesis, the doctor in charge of the patient and his/her observations and specimen attribute information such as the date of a blood test, the test number, the date of blood collection, the type of the corresponding specimen and comments on the specimen. The virtual slide operating portion 3 is provided with a client terminal 31 for evaluating and confirming the corresponding virtual slides.

Figure 2:
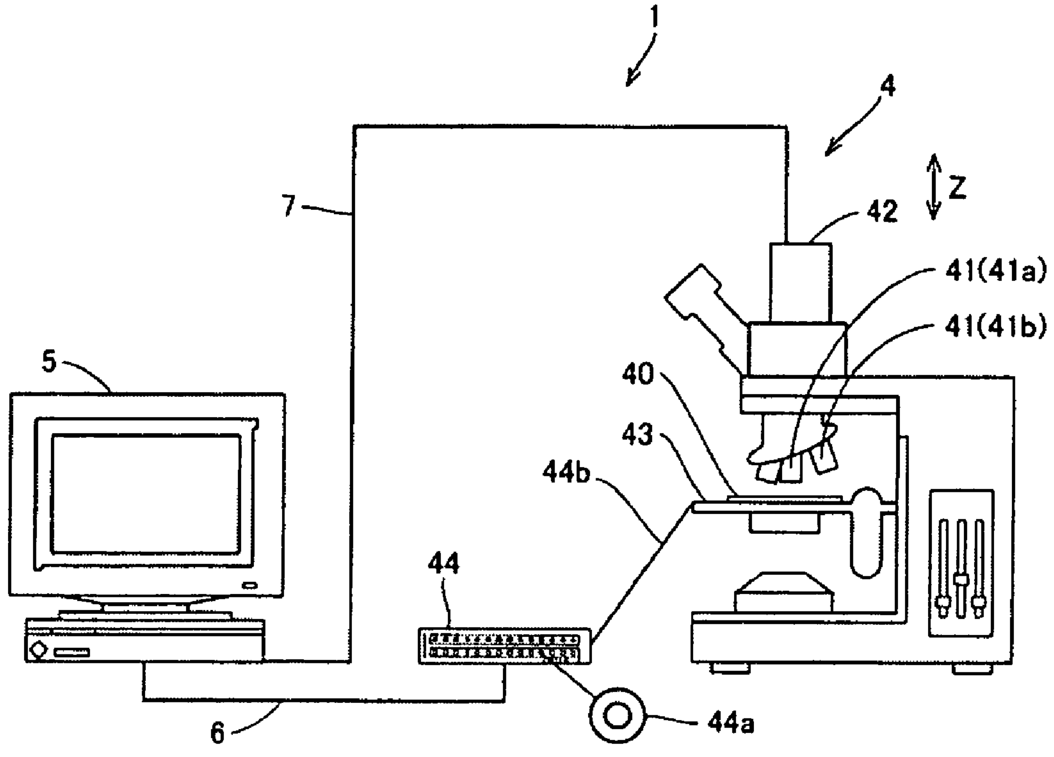
FIG. 2 illustrates the overall structure of the image creating apparatus according to the embodiment of the present invention.

The image creating apparatus 1 according to this embodiment comprises an optical microscope 4 and a terminal 5, as shown in FIG. 2. BX-50 series by Olympus Optical Co., Ltd., for example, can be employed as the optical microscope 4.

The optical microscope 4 of the image creating apparatus 1 is constituted of an objective lens 41, a 3CCD camera 42, an automatic stage 43 and a control unit 44. The objective lens 41 is provided for obtaining enlarged images of a blood cell smeared on a slide 40. This objective lens 41 includes a 20-magnification objective lens 41*a* and a 100-magnification objective lens 41*b*. The 3CCD camera 42 is provided for picking up the enlarged images of the blood cell smeared on the slide 40 through the objective lens 41. KY-F70B by Victor Company of Japan, Ltd., for example, can be employed as the 3CCD camera 42.

According to this embodiment, the automatic stage 43 of the optical microscope 4 is enabled to hold the slide 40 smeared with the blood cell and move the same in three directions, i.e., X-axis, Y-axis and Z-axis directions. The X-axis direction is a prescribed direction parallel to the surface of the automatic stage 43 holding the slide 40. The Y-axis direction is perpendicular to the X-axis direction and parallel to the surface of the automatic stage 43. The Z-axis direction (see FIG. 2) is perpendicular to the surface of the automatic stage 43.

According to this embodiment, the image creating apparatus 1 varies the depth-directional focal position (along the Z axis) of the objective lens 41 with respect to the blood cell in the identical field by moving the automatic stage 43 holding the slide 40 smeared with the blood cell in the Z-axis direction. Thus, the 3CCD camera 42 can pick up images of the blood cell through the objective lens 41 on a plurality of depth-directional positions (along the Z axis) of the blood cell in the identical field.

Further, the image creating apparatus 1 varies the planar field of the objective lens 41 with respect to the blood cell by moving the automatic stage 43 holding the slide 40 smeared with the blood cell in the X-axis direction (Y-axis direction). Thus, the 3CCD camera 42 can pick up images of the overall area of a planar range 40*a* (see FIGS. 3 and 4) of the blood cell for creating virtual slides in a planarly divided manner. H101BX by Prior Scientific, for example, can be employed as the automatic stage 43.

The control unit 44 of the optical microscope 4 is provided for position-controlling the automatic stage 43. The control unit 44, including a joystick 44*a*, is connected to the automatic stage 43 through a cable 44*b*. An operator moves the automatic stage 43 in the X-, Y- and Z-axis directions respectively by manipulating the joystick 44*a*.

The terminal 5 of the image creating apparatus 1 is connected to the control unit 44 and the 3CCD camera 42 through cables 6 and 7 respectively. Thus, the terminal 5 transmits a control signal for controlling the control unit 44 to the control unit 44 through the cable 6. The data of the images picked up by the 3CCD camera 42 are transmitted to the terminal 5 through the cable 7.

Figure 3:
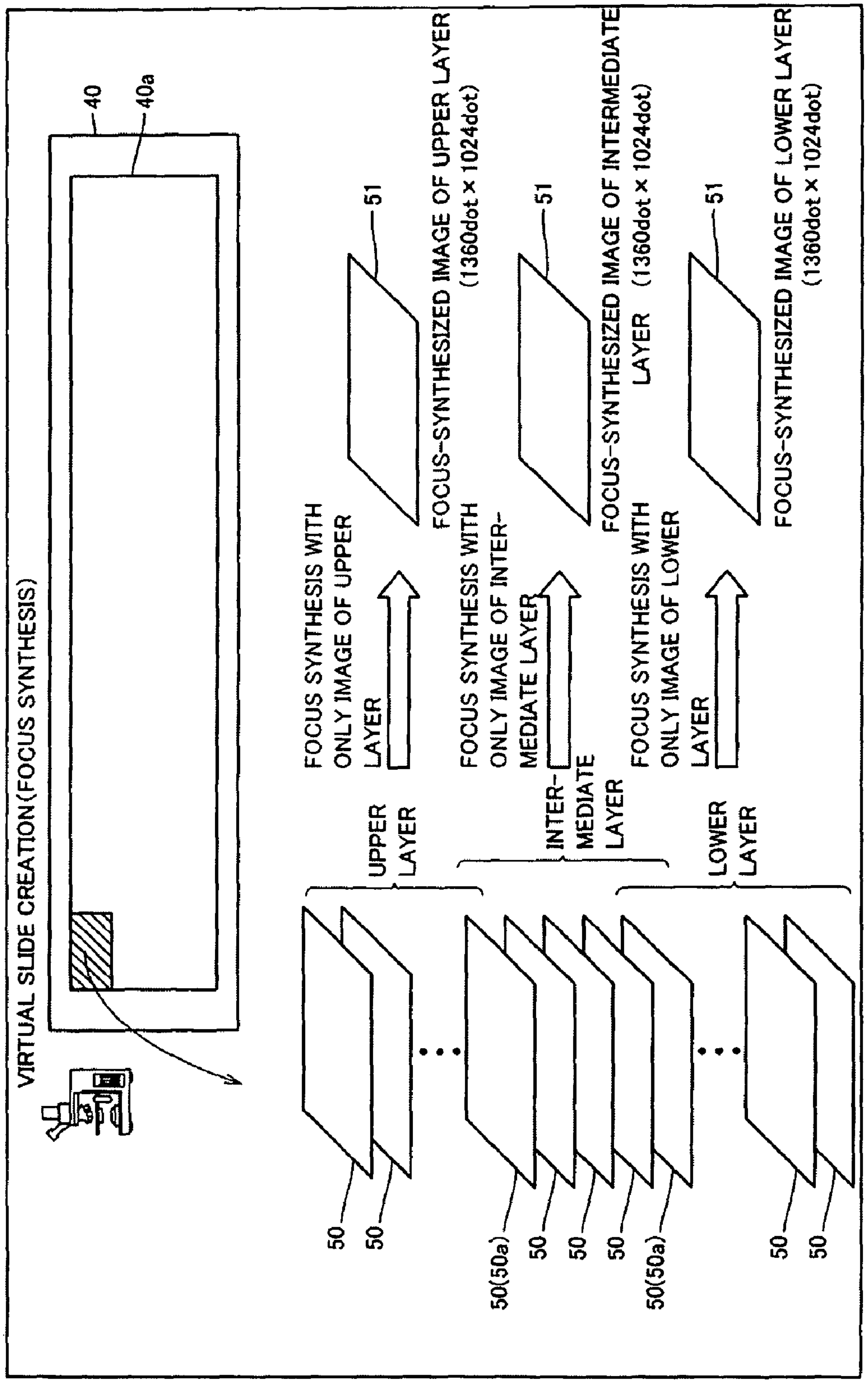
FIGS. 3 to 5 are schematic diagrams for illustrating functions of a terminal constituting the image creating apparatus according to the embodiment shown in FIG. 2.

The terminal 5 of the image creating apparatus 1 according to this embodiment classifies a plurality of images 50 picked up on the plurality of different depth-directional positions (along the Z axis) of the blood cell in the identical field into three depth ranges (hereinafter referred to upper, intermediate and lower layers respectively), as shown in FIG. 3. Further, the terminal 5 so classifies the plurality of images 50 picked up on the plurality of different depth-directional positions (along the Z axis) of the blood cell as to include images 50*a* overlapping between the adjacent layers (between the upper and intermediate layers and between the intermediate and lower layers). The image creating apparatus 1 creates focus-synthesized images 51 every three layers in the identical field by focus-synthesizing the plurality of images 50, including the images 50*a*, belonging to the respective ones of the three layers (upper, intermediate and lower layers) every three layers. According to this embodiment, the image creating apparatus 1 creates the focus-synthesized images 51 by selecting pixels having the highest contrast from among those of identical positions (pixels having identical X- and Y-coordinate values) included in the images 50 belonging to the depth ranges (upper, intermediate and lower layers) respectively as pixels in focus and combining the selected pixels with each other when creating the focus-synthesized images 51 every three layers (upper, intermediate and lower layers). The term "focus synthesis" indicates processing of extracting pixels in focus from the plurality of images 50 (identical field) having different focal positions (different depth-directional positions of the blood cell) and creating entirely focused single images (focus-synthesized images 51). The upper and intermediate layers are adjacent to each other along the depth direction (Z-axis direction) of the blood cell, while the intermediate and lower layers are also adjacent to each other along the depth direction (Z-axis direction) of the blood cell.

Figure 4:
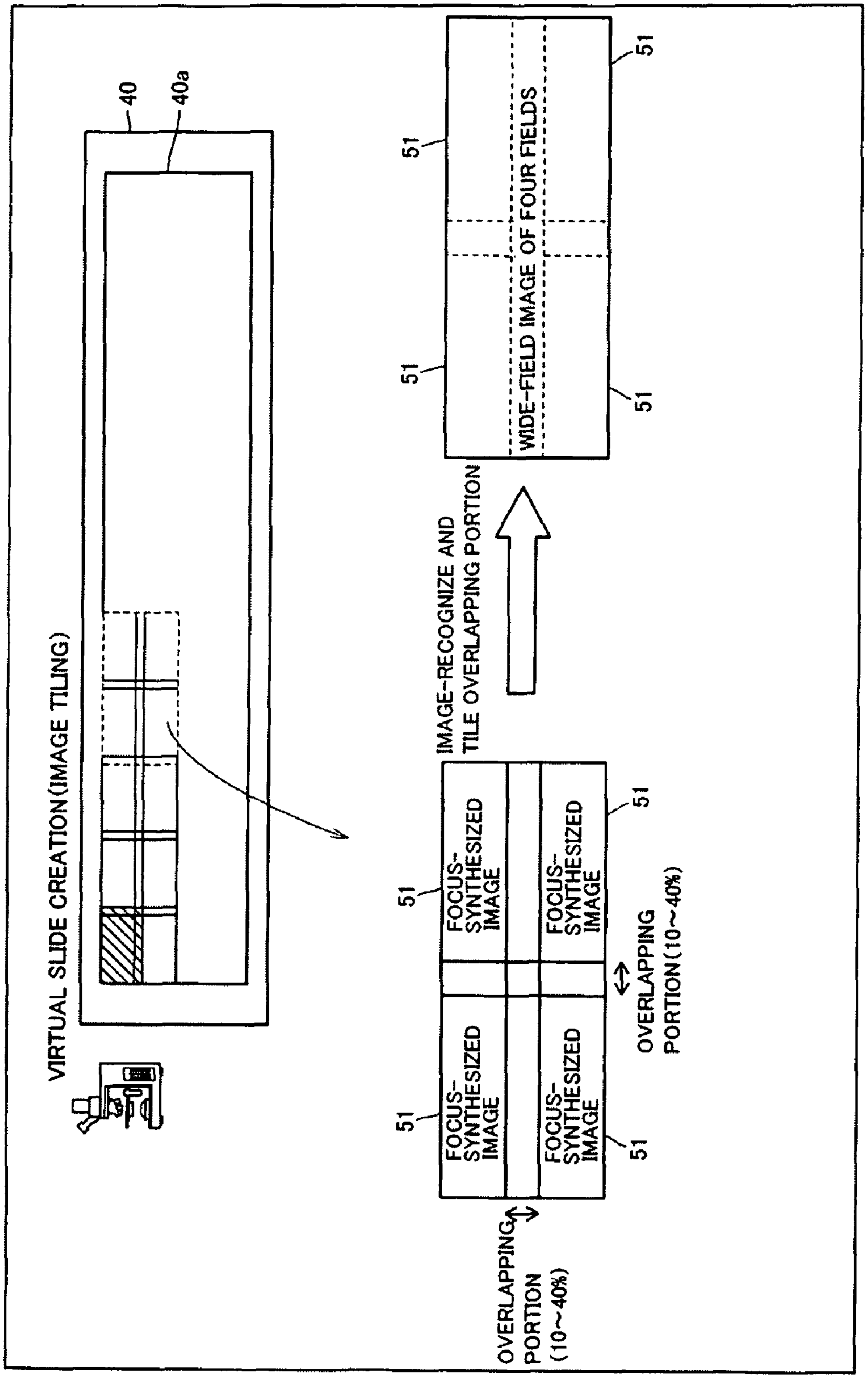

According to this embodiment, the terminal 5 (see FIG. 2) of the image creating apparatus 1 also has a function of image-tiling the plurality of focus-synthesized images 51 corresponding to the three layers (upper, intermediate and lower layers) respectively every three layers, in addition to the function of creating the focus-synthesized images 51 every three layers in the identical field, as shown in FIG. 4. More specifically, the terminal 5 creates the plurality of focus-synthesized images 51 every three layers (upper, intermediate and lower layers) for dividing the overall area of the planar range 40*a* of the blood cell for creating virtual slides. The terminal 5 has the function of image-tiling the planarly divided plurality of focus-synthesized images 51 corresponding to the aforementioned three layers (upper, intermediate and lower layers) respectively every three layers, thereby creating three virtual slides 52 (see FIG. 5) corresponding to the three layers respectively. The database 21*a* (see FIG. 1) of the server 21 preserves the three virtual slides 52 corresponding to the three layers (upper, intermediate and lower layers) respectively.

According to this embodiment, as hereinabove described, the image creating apparatus 1, comprising the terminal 5 capable of classifying the plurality of images 50 picked up on the different focal positions into the three layers (upper, intermediate and lower layers) and focus-synthesizing the plurality of images 50 belonging to the three layers respectively every three layers, can create the virtual slides 52 in focus with respect to three cell structures (granule, nucleus and cytoplasm) of the blood cell respectively every three cell structures also when the three cell structures are distributed in a state dispersed in the focal direction, for example. Thus, the image creating apparatus 1, capable of providing the virtual slides 52 in focus with respect to the three cell structures in the blood cell respectively, allows reliable determination of the cell structures in the blood cell. Further, the image creating apparatus 1, capable of suppressing overlapped imaging of the three cell structures in the blood cell by creating the virtual slides 52 every three layers dissimilarly to a case of creating only a single virtual slide 52 for the overall blood cell, can create the virtual slides 52 allowing reliable determination of the cell structures in the blood cell.

According to this embodiment, the image creating apparatus 1 can easily create the virtual slides 52 in focus by selecting pixels having the highest contrast in the images 50 belonging to the corresponding layers (upper, intermediate and lower layers) as the pixels in focus and creating the focus-synthesized images 51 by combining the selected pixels with each other when creating the focus-synthesized images 51.

When a cell structure to be noted is present on the boundary between two adjacent layers, for example, a focus-synthesized image 51 created with no overlapping image 50*a* may so unclearly reflect the cell structure that a user cannot recognize the same. However, the image creating apparatus 1 according to this embodiment can clearly reflect the cell structures on the respective focus-synthesized images 51 by classifying the plurality of images 50 to include the images 50*a* overlapping between the adjacent layers (between the upper and intermediate layers and between the intermediate and lower layers).

According to this embodiment, the image creating apparatus 1, enabled to pick up the images 50 of the blood cell on the plurality of different depth-directional positions (along the Z axis) of the blood cell with the 3CCD camera 42 through the objective lens 41 by varying the depth-directional focal position (along the Z axis) of the objective lens 41 with respect to the blood cell, can easily pick up the plurality of enlarged images 50 to be focus-synthesized on the respective ones of the plurality of different focal positions. Further, the image creating apparatus 1 provided with the automatic stage 43 for varying the focal position in the identical field can obtain the images 50 different from each other only in the positions along the focal direction (i.e., the direction perpendicular to the planar direction of the images 50) in the identical field.

According to this embodiment, the terminal 5 is enabled to also image-tile the plurality of focus-synthesized images 51 corresponding to the respective ones of the three layers (upper, intermediate and lower layers) every three layers, whereby joints between the adjacent focus-synthesized images 51 can be rendered inconspicuous when the image creating apparatus 1 creates each virtual slide 52 with the plurality of focus-synthesized images 51.

A method of creating the virtual slides 52 in the image creating apparatus 1 according to this embodiment is now described with reference to FIGS. 1 to 6.

Figure 6:
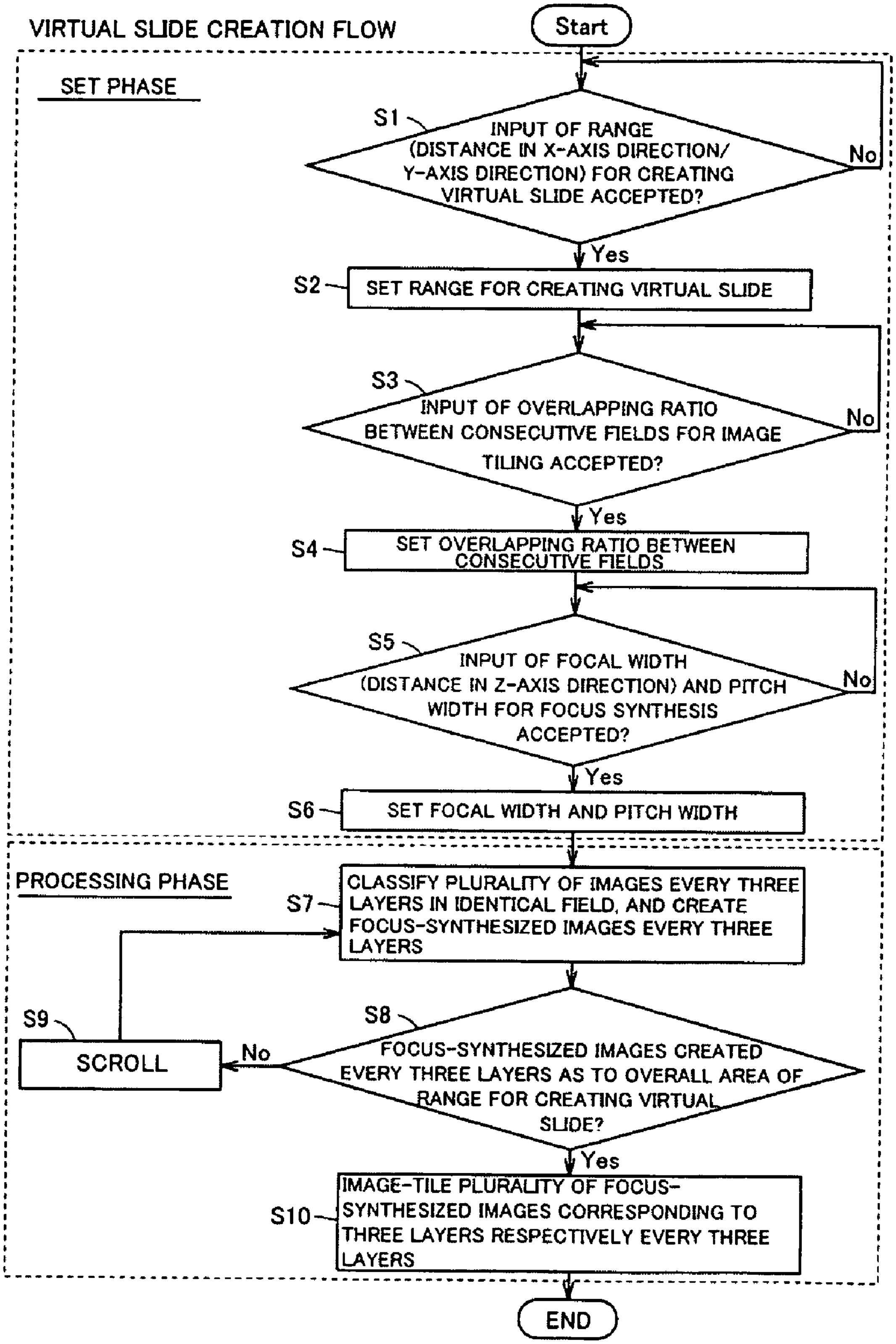
FIG. 6 is a flow chart for illustrating a virtual slide creation flow in the image creating apparatus according to the embodiment of the present invention.

A virtual slide creation flow in the image creating apparatus 1 according to this embodiment includes a set phase and a processing phase, as shown in FIG. 6. In the set phase, the operator first sets the slide 40 smeared with the blood cell on the automatic stage 43 of the optical microscope 4 shown in FIG. 2.

At a step S1 in FIG. 6, the image creating apparatus 1 determines whether or not an input of a planar range (distances in the X- and Y-axis directions) of the blood cell for creating the virtual slides 52 has been accepted through the terminal 5 (see FIG. 2). When the image creating apparatus 1 determines that no input of the range for creating the virtual slides 52 has been accepted, the operator inputs the planar range of the blood cell for creating the virtual slides 52 through an input unit of the terminal 5. When the image creating apparatus 1 determines that the input of the planar range of the blood cell for creating the virtual slides 52 has been accepted, on the other hand, the process advances to a step S2.

At the step S2 in FIG. 6, the image creating apparatus 1 sets the planar range of the blood cell for creating the virtual slides 52 through the terminal 5 (see FIG. 2).

At a step S3 in FIG. 6, the image creating apparatus 1 determines whether or not an input of an overlapping ratio between consecutive fields for image tiling has been accepted through the terminal 5 (see FIG. 2). When the image creating apparatus 1 determines that no input of the overlapping ratio between the consecutive fields has been accepted, the operator inputs the overlapping ratio between the consecutive fields through the input unit of the terminal 5. When the image creating apparatus 1 determines that the input of the overlapping ratio between the consecutive fields has been accepted, on the other hand, the process advances to a step S4.

At the step S4 in FIG. 6, the image creating apparatus 1 sets the overlapping ratio between the consecutive fields through the terminal 5 (see FIG. 2). This overlapping ratio is preferably set to at least about 10% and not more than about 0%.

At a step S5 in FIG. 6, the image creating apparatus 1 determines whether or not an input of a focal width (distance in the Z-axis direction) and a pitch width for focus synthesis has been accepted through the terminal 5 (see FIG. 2). When the image creating apparatus 1 determines that no input of the focal width and the pitch width has been accepted, the operator inputs the focal width and the pitch width through the input unit of the terminal 5. When the image creating apparatus 1 determines that the input of the focal width and the pitch width has been accepted, on the other hand, the process advances to a step S6.

At the step S6 in FIG. 6, the image creating apparatus 1 sets the focal width and the pitch width through the terminal 5 (see FIG. 2). Thus, the image creating apparatus 1 determines the plurality of depth-directional positions (along the Z axis) of the blood cell whose images 50 are picked up by the 3CCD camera 42 (see FIG. 2) through the objective lens 41 in the identical field. According to this embodiment, the focal width and the pitch width are set to not more than about 1 mm and to about 0.1 □m respectively. The set phase of the virtual slide creation flow is completed through the aforementioned steps S1 to S6.

In the processing phase, the image creating apparatus 1 creates the focus-synthesized images 51 every three layers (upper, intermediate and lower layers) in the identical field at a step S7 in FIG. 6. More specifically, the image creating apparatus 1 first picks up the images 50 of the blood cell on the plurality of different depth-directional positions (along the Z axis) of the blood cell in the identical field with the 3CCD camera 42 through the objective lens 41. Further, the image creating apparatus 1 fetches the plurality of images 50 (see FIG. 3) picked up by the 3CCD camera 42 into the terminal 5 (see FIG. 2). Thus, the terminal 5 stores the plurality of images 50 corresponding to prescribed areas in the planar range 40*a* (see FIG. 3) of the blood cell for creating the virtual slides 52.

At this time, the image creating apparatus 1 classifies the plurality of images 50 picked up on the plurality of different depth-directional positions (along the Z axis) of the blood cell into the three layers (upper, intermediate and lower layers). The image creating apparatus 1 classifies the plurality of images 50 into the three layers (upper, intermediate and lower layers), to include the images 50*a* overlapping between the adjacent layers (between the upper and intermediate layers and between the intermediate and lower layers).

Thereafter the image creating apparatus 1 focus-synthesizes the plurality of images 50, including the images 50*a*, belonging to the three layers (upper, intermediate and lower layers) in the identical field every three layers. At this time, the image creating apparatus 1 selects the pixels having the highest contrast included in the images 50 belonging to the corresponding layers (upper, intermediate and lower layers) as the pixels in focus and combines the selected pixels with each other, thereby focus-synthesizing the images 50. Thus, the image creating apparatus 1 creates the focus-synthesized images 51 corresponding to the prescribed areas in the planar range 40*a* of the blood cell for creating the virtual slides 52 every three layers (upper, intermediate and lower layers) in the identical field. The resolution of the focus-synthesized images 51 is 1360 dots by 1024 dots, and the image system thereof is the TIF system. The focus-synthesized images 51 may alternatively have a resolution other than 1360 dots by 1024 dots. Further, the focus-synthesized images 51 may be in an image system other than the TIF system. The image creating apparatus 1 creates the aforementioned focus-synthesized images 51 as to the overall area of the planar range 40*a* of the blood cell for creating the virtual side 40.

At a step S8 in FIG. 6, the image creating apparatus 1 determines whether or not the focus-synthesized images 51 (see FIG. 3) have been created every three layers (upper, intermediate and lower layers) as to the overall area in the planar range 40*a* (see FIG. 3) of the blood cell for creating the virtual slides 52. When determining that no focus-synthesized images 51 have been created every three layers (upper, intermediate and lower layers) as to the overall area of the planar range 40*a* of the blood cell for creating the virtual slides 52*a*, the image creating apparatus 1 carries out the step S7 for focus synthesis again after performing scrolling at a step S9. When determining that the focus-synthesized images 51 have been created every three layers (upper, intermediate and lower layers) as to the overall area of the planar range 40*a* of the blood cell for creating the virtual slides 52*a*, on the other hand, the image creating apparatus 1 advances to a step S10.

Figure 5:
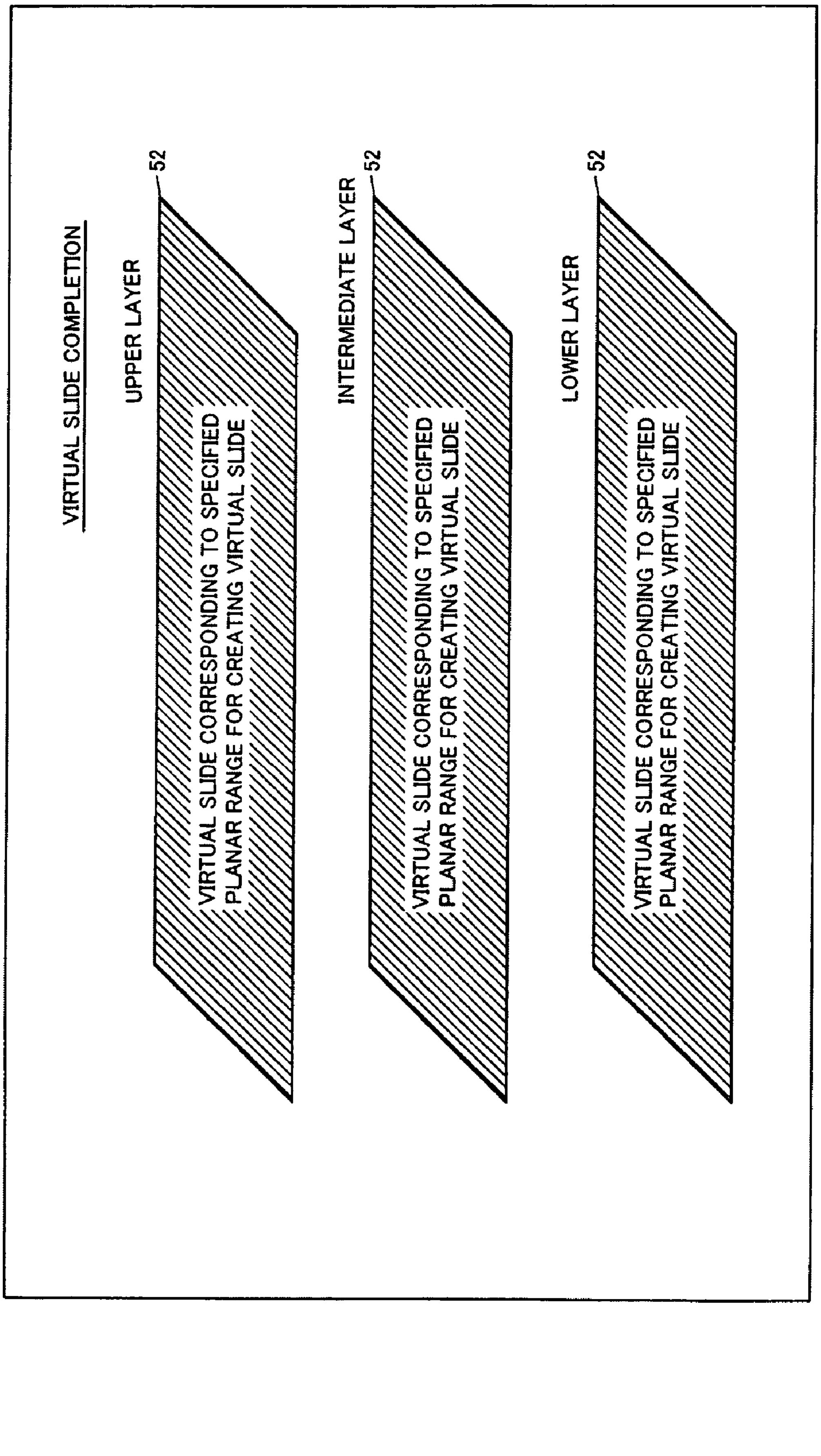

At the step S10 in FIG. 6, the image creating apparatus 1 image-tiles the plurality of focus-synthesized images 51 (see FIG. 3) corresponding to the three layers (upper, intermediate and lower layers) respectively every three layers in consideration of the overlapping ratio between the consecutive fields set at the step S4 through the terminal 5 (see FIG. 2). At this time, the image creating apparatus 1 image-recognizes the overlapping portions of the adjacent focus-synthesized images 51 thereby pasting the overlapping portions so that the joints between the adjacent focus-synthesized images 51 are inconspicuous, as shown in FIG. 4. Thus, the image creating apparatus 1 completes the virtual slides 52 one by one for the three layers (upper, intermediate and lower layers) as to the planar range 40*a* of the blood cell for creating the virtual slides 52, as shown in FIG. 5. The image system of the virtual slides 52 is the BMP system, and the size thereof is about 220,000 dots by 134,000 dots. The virtual slides 52 may alternatively be in an image system other than the BMP system. Further, the virtual slides 52 may alternatively have a size other than 220,000 dots by 134,000 dots. Thereafter the image creating apparatus 1 preserves the virtual slides 52 created in the aforementioned manner in the server 21 (see FIG. 1) every three layers (upper, intermediate and lower layers).

A method of dividing each virtual slide 52 is now described with reference to FIGS. 1, 7 and 8.

The image creating apparatus 1 divides each virtual slide 52 (see FIG. 7) in the server 21 of the virtual slide dividing/managing portion 2 shown in FIG. 1. According to the method of dividing each virtual slide 52, the image creating apparatus 1 first selects the virtual slide 52 to be divided from among the virtual slides 52, having the size of about 220,000 dots by 134,000 dots, preserved in the server 21 at a step S21 in FIG. 8.

Figure 7:
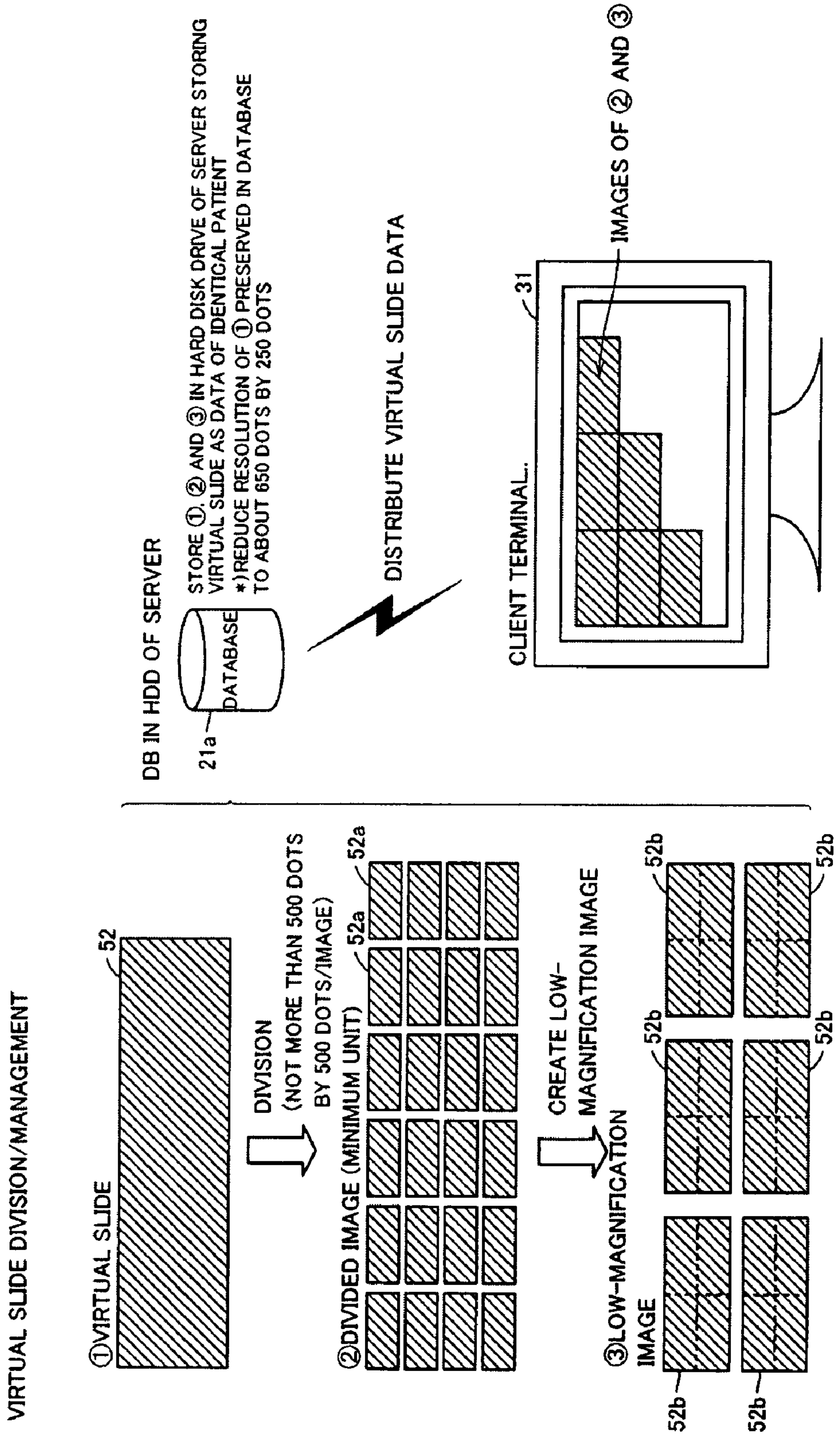
FIG. 7 is a schematic diagram for illustrating a method of dividing a virtual side created by the image creating apparatus according to the embodiment of the present invention.
Figure 8:
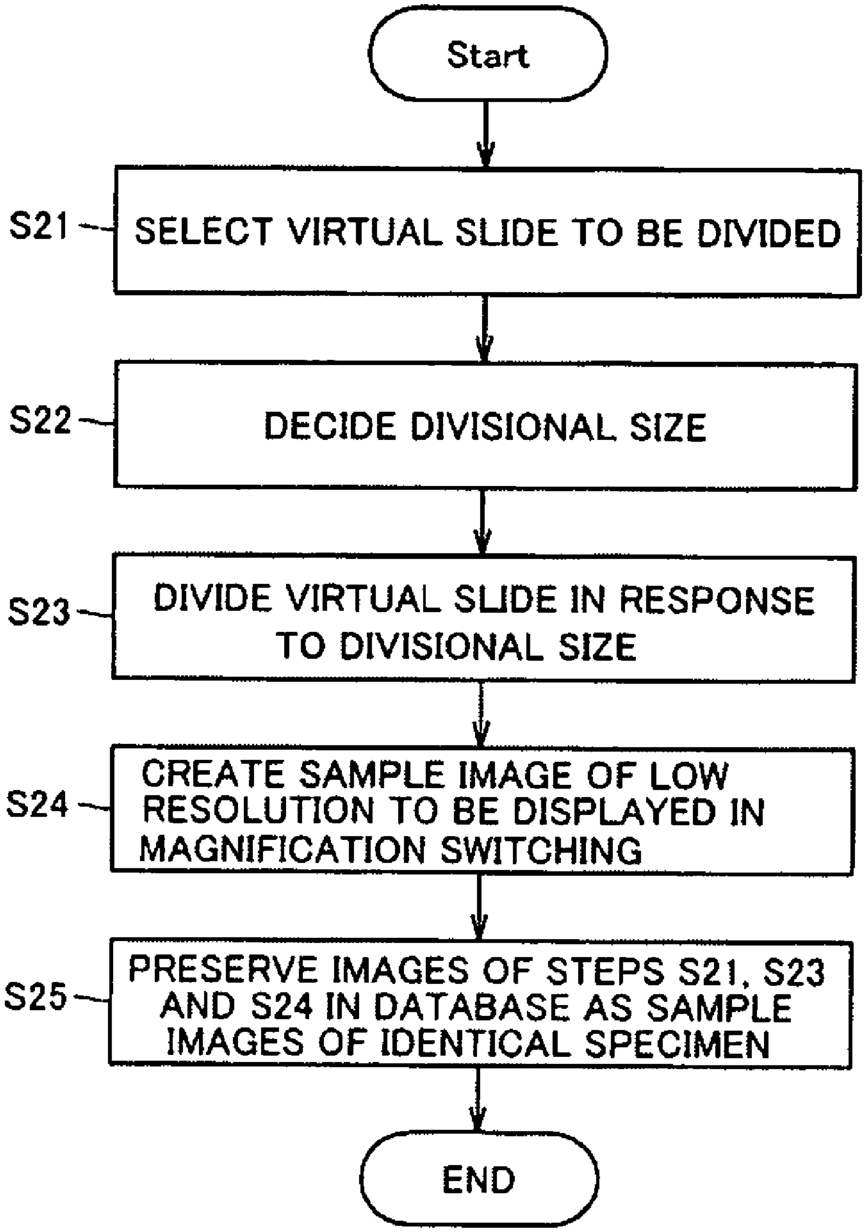
FIG. 8 is a flow chart for illustrating a flow of dividing the virtual side created by the image creating apparatus according to the embodiment of the present invention.

At a step S22 in FIG. 8, the image creating apparatus 1 decides the divisional size. According to this embodiment, the image creating apparatus 1 divides the virtual slide 52 into 500 dots by 500 dots/image, as shown in FIG. 7. The divisional size is preferably 10 dots by 10 dots to 700 dots by 700 dots, and more preferably 100 dots by 100 dots to 500 dots by 500 dots.

At a step S23 in FIG. 8, the image creating apparatus 1 divides the virtual slide 52 (see FIG. 7) in response to the divisional size (500 dots by 500 dots/image) decided at the step S22, thereby creating divided images 52*a* shown in FIG. 7. The JPEG system (compressibility in photoshop version 7.0.1: about 10) is employed as the image system of the divided images 52*a*.

At a step S24 in FIG. 8, the image creating apparatus 1 creates low-magnification images 52*b* (see FIG. 7) as low-resolution sample images to be displayed in magnification switching. More specifically, the image creating apparatus 1 creates wide-field images (low-magnification images 52*b*) by pasting several sets (four sets in this embodiment) of the divided images 52*a* with each other, as shown in FIG. 7. Then, the image creating apparatus 1 reduces the resolution of the created wide-field images (low-magnification images 52*b*), thereby reducing the file size. For example, the image creating apparatus 1 creates low-magnification images 52*b* of 10 magnifications from the virtual slide 52 created through the 20-magnification objective lens 41*a* (see FIG. 1) of the optical microscope 4, while creating low-magnification images 52*b* of 40, 60 and 80 magnifications from the virtual slide 52 created through the 100-magnification objective lens 41*b* of the optical microscope 4. The JPEG system (compressibility in photoshop version 7.0.1: about 10) is employed as the image system of the low-magnification images 52*b*.

At a step S25 in FIG. 8, the image creating apparatus 1 preserves the virtual slide 52, the divided images 52*a* and the low-magnification images 52*b* created at the steps S21, S23 and S24 as a total image and partial images respectively in the database 21*a* of the server 21 shown in FIG. 1 as sample images of the identical specimen (identical patient) along with the identification information of the specimen. The image creating apparatus 1 reduces the resolution of the virtual slide 52 preserved in the database 21*a* as the total image to about 650 dots by 250 dots. A relational database, for example, is employed as the database 21*a* of the server 21 storing the virtual slide 52, the divided images 52*a* and the low-magnification images 52*b*.

Figure 9:
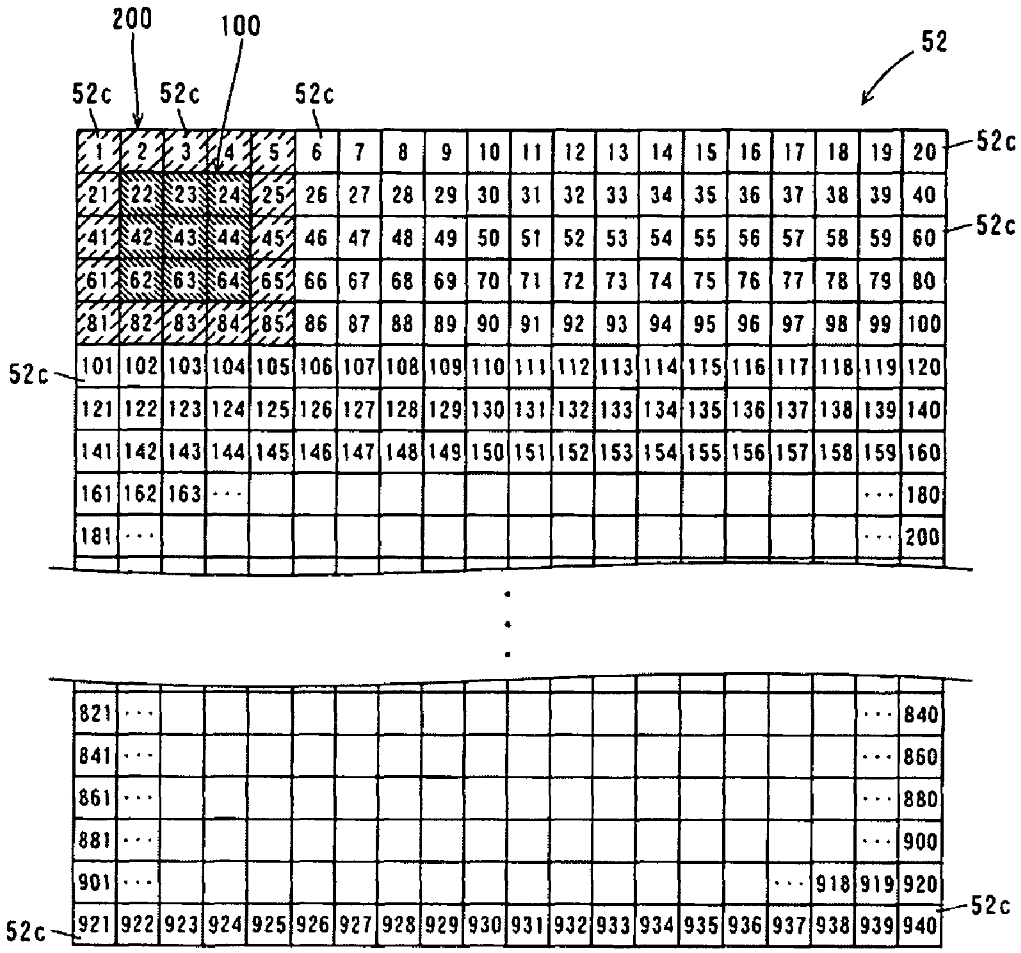
FIG. 9 is a diagram for illustrating a sequence of downloading partial images in a method of downloading the virtual side created by the image creating apparatus according to the embodiment of the present invention.

A case of downloading virtual slides 52 of three types of magnifications, i.e., 20, 40 and 80 magnifications, is now described with reference to FIGS. 1 and 9 to 13. Referring to FIG. 9, numbers "1" to "940" are allocated to partial images 52*c*, in order to specify the respective partial images 52*c* in the following illustration of the method of downloading the virtual slides 52.

The virtual slide 52 of 20 magnifications shown in FIG. 9 is constituted of a plurality of partial images 52*c*, and preserved in the database 21*a* (see FIG. 1) of the server 21. Each of the virtual slides 52 (not shown) of 40 and 80 magnifications is also constituted of a plurality of partial images 52*c* and preserved in the database 21*a* of the server 21. The partial images

52*c* of the aforementioned virtual slide 52 of 20 magnifications may be constituted of a plurality of divided images created through the 20-magnification objective lens 41*a* (see FIG. 1), or of low-magnification images prepared by pasting a plurality of divided images created through the 100-magnification objective lens 41*b* (see FIG. 1) and reducing the resolution thereof. The partial images of each of the virtual slides 52 of 40 and 80 magnifications may be constituted of low-magnification images prepared by pasting a plurality of divided images created through the 100-magnification objective lens 41*b* and reducing the resolution thereof. Thus, the partial images of the virtual slides 52 can be created by any method. As shown in FIG. 9, the size of the virtual slide 52 of 20 magnifications preserved in the database 21*a* of the server 21 is 23,500 dots by 10,000 dots, and the size of each divided partial image 52*c* is 500 dots by 500 dots. In other words, the virtual slide 52 of 20 magnifications is constituted of 940 partial images 52*c*. The virtual slide 52 may alternatively have a size other than 23,500 dots by 10,000 dots, and each divided partial image 52*c* may alternatively have a size other than 500 dots by 500 dots.

Figure 10:
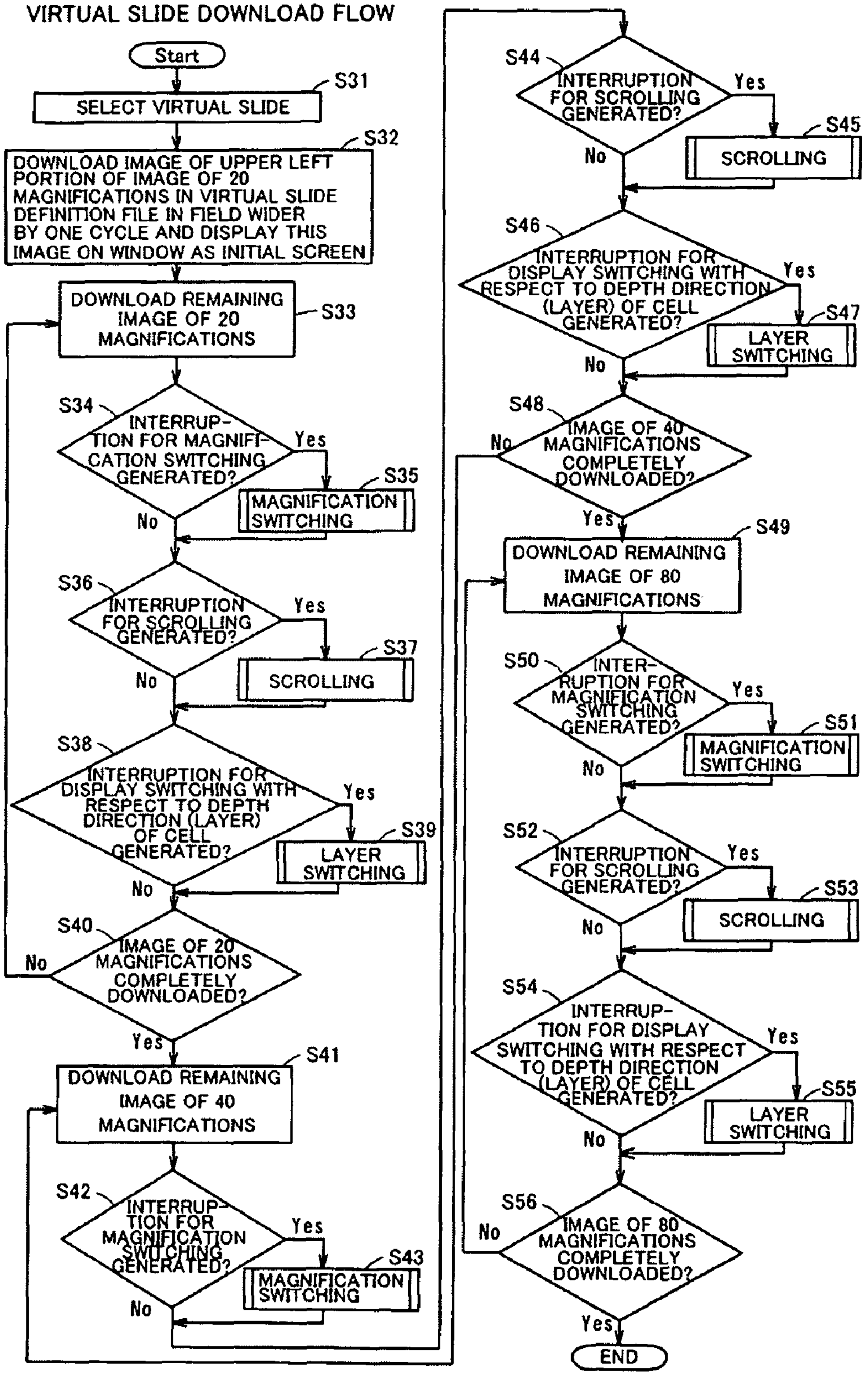
FIGS. 10 to 13 are flow charts for illustrating the method of downloading the virtual side created by the image creating apparatus according to the embodiment of the present invention.

When downloading the virtual slide 52 from the server 21 to the client terminal 31 (see FIG. 1), the user selects the virtual slide 52 (see FIG. 9) to be displayed on the client terminal 31 at a step S31 in FIG. 10.

As shown in FIG. 9, the client terminal 31 (see FIG. 1) is so set as to display an image corresponding to a range 100 of an upper left portion of the selected virtual slide 52 on a window as an initial screen. According to this setting, the image creating apparatus 1 downloads an image of the upper left portion of the virtual slide 52 of 20 magnifications from the server 21 (see FIG. 1) to the client terminal 31 at a step S32 in FIG. 10. At this time, the image creating apparatus 1 downloads an image corresponding to a range 200 wider by one cycle than the range 100 displayed on the window as the initial screen of the client terminal 31 (see FIG. 1), as shown in FIG. 9. Thus, the image creating apparatus 1 displays the image corresponding to the range 100 of the upper left portion on the window of the client terminal 31 as the initial screen. The image creating apparatus 1 can vary the magnification and the range of the virtual slide 52 displayed on the window of the client terminal 31 as the initial screen by setting.

The image creating apparatus 1 downloads the partial images 52*c* constituting the virtual slide 52 of 20 magnifications preserved in the database 21*a* (see FIG. 1) of the server 21 according to the following order set in advance:

First, the image creating apparatus 1 downloads the partial images 52*c* ("1" to "20") of the uppermost stage from among the plurality of partial images 52*c* included in the virtual slide 52 of 20 magnifications. At this time, the image creating apparatus 1 sequentially downloads the partial images 52*c* from the left end "1" toward the right end "20" of the uppermost stage. After downloading the partial images 52*c* up to that on the right end "20" of the uppermost stage, the image creating apparatus 1 downloads the partial images 52*c* ("21" to "40") of the second stage. Also in this case, the image creating apparatus 1 sequentially downloads the partial images 52*c* from the left end "21" toward the right end "40" of the second stage. Then, the image creating apparatus 1 downloads the partial images 52*c* ("41" to "60") of the third stage. Finally, the image creating apparatus 1 downloads the partial images 52*c* up to the right end "940" of the lowermost stage ("921" to "940"), thereby completely downloading all partial images 52*c* included in the virtual slide 52 of 20 magnifications.

Thereafter the image creating apparatus 1 downloads the partial images 52*c* constituting the virtual slide 52 of 40 magnifications preserved in the database 21*a* (see FIG. 1) of the server 21 according to the same order as that for the aforementioned partial images 52*c*. Further, the image creating apparatus 1 thereafter downloads the partial images 52*c* constituting the virtual slide 52 of 80 magnifications preserved in the database 21*a* (see FIG. 1) of the server 21 according to the same order as that for the aforementioned partial images 52*c*.

According to the aforementioned order, the image creating apparatus 1 downloads the partial images 52*c* at the aforementioned step S32 in the order "1"→"5", "21"→"25", "41"→"45", "61"→"65" and "81"→"85" shown in FIG. 9. In this case, the window of the client terminal 31 (see FIG. 1) displays the partial images 52*c* of "22" to "24", "42" to "44" and "62" to "64" as the initial screen. The window of the client terminal 31 does not display the partial images 52 of "1" to "5", "21", "25", "41", "45", "61", "65" and "81" to "85", downloaded in the range 200, wider by one cycle, enclosing the displayed range 100 as the initial screen.

At a step S33 in FIG. 10, the image creating apparatus 1 downloads the remaining partial images 52*c* of 20 magnifications in the background without displaying the same, while displaying the image corresponding to the range 100 of the upper left portion of the virtual slide 52 shown in FIG. 9 on the window. The image creating apparatus 1 downloads the partial images 52*c* in the background regardless of an instruction from the user. Also in this case, the image creating apparatus 1 downloads the partial images 52*c* according to the aforementioned order. In other words, the image creating apparatus 1 downloads the partial images 52*c* in the order "6"→"20", "26"→"40", "46"→"60", "66"→"80", "86"→"100", "101"→"120", "121"→"140", . . . , "901"→"920" and "921"→"940" shown in FIG. 9. A local HDD (hard disk drive; not shown) serving as a memory of the client terminal 31 (see FIG. 1) preserves the partial images 52*c* downloaded from the server 21 (see FIG. 1).

At a step S34 in FIG. 10, the image creating apparatus 1 determines whether or not an interruption for magnification switching has been generated by the user while downloading the remaining partial images 52*c* of 20 magnifications. When determining that the interruption for magnification switching has been generated, the image creating apparatus 1 temporarily interrupts the download of the remaining partial images 52*c* of 20 magnifications. Then, the image creating apparatus 1 advances to a step S35, for switching the magnification preferentially to the download of the remaining partial images 52*c* of 20 magnifications.

Figure 11:
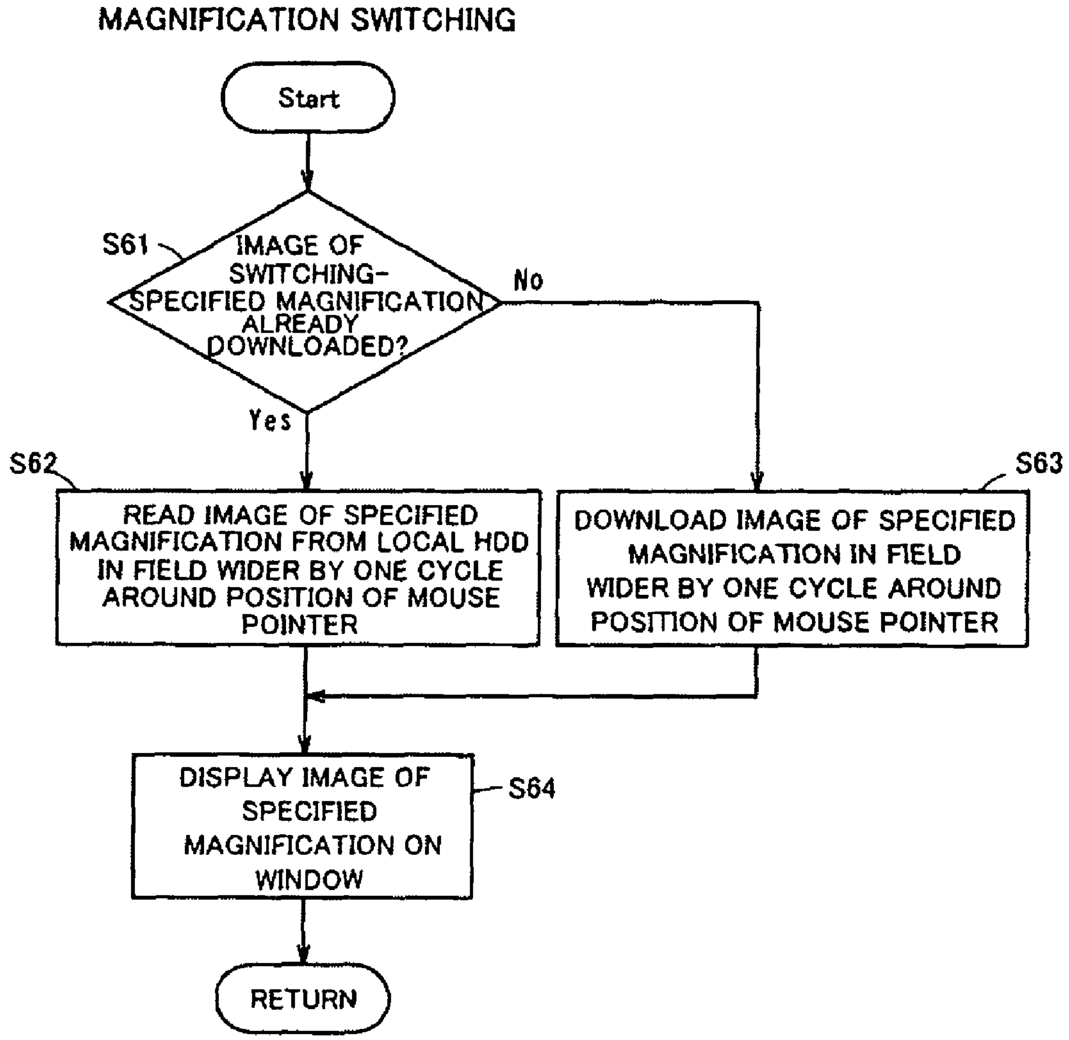

In order to switch the magnification at the step S35 in FIG. 10, the image creating apparatus 1 first determines whether or not the partial images 52*c* of the switching-specified magnification (40 or 80 magnifications) have already been downloaded to the client terminal 31 (see FIG. 1) at a step S61 in FIG. 11. When determining that the partial images 52*c* of the switching-specified magnification have already been downloaded to the client terminal 31, the image creating apparatus 1 reads the partial images 52*c* of the specified magnification from the local HDD (not shown) of the client terminal 31 in a field wider by one cycle around the position of a mouse pointer at a step S62. When determining that the partial images 52*c* of the switching-specified magnification have not yet been downloaded to the client terminal 31, on the other hand, the image creating apparatus 1 downloads the partial images 52*c* of the specified magnification from the local HDD (not shown) of the client terminal 31 in the field wider by one cycle around the position of the mouse pointer at a step S63. Thus, the image creating apparatus 1 preferentially displays an image of an upper left portion of the virtual slide 52 of the specified magnification on the window of the client terminal 31 at a step S64. The image creating apparatus 1 also downloads the partial images 52*c* of the specified magnification (40 or 80 magnifications) according to the same order as that for the aforementioned partial images 52*c* of 20 magnifications.

After completing the magnification switching at the step S35 in FIG. 10 (steps S61 to S64 in FIG. 11), the image creating apparatus 1 advances to a step S36. The image creating apparatus 1 also advances to the step S36 when determining that no interruption for magnification switching has been generated at the step S34 in FIG. 10.

At the step S36 in FIG. 10, the image creating apparatus 1 determines whether or not an interruption for scrolling has been generated by the user. When determining that the interruption for scrolling has been generated, the image creating apparatus 1 temporarily interrupts the download of the remaining partial images 52*c* of 20 magnifications. Then, the image creating apparatus 1 advances to a step S37, for performing scrolling preferentially to the download of the remaining partial images 52*c* of 20 magnifications.

Figure 12:
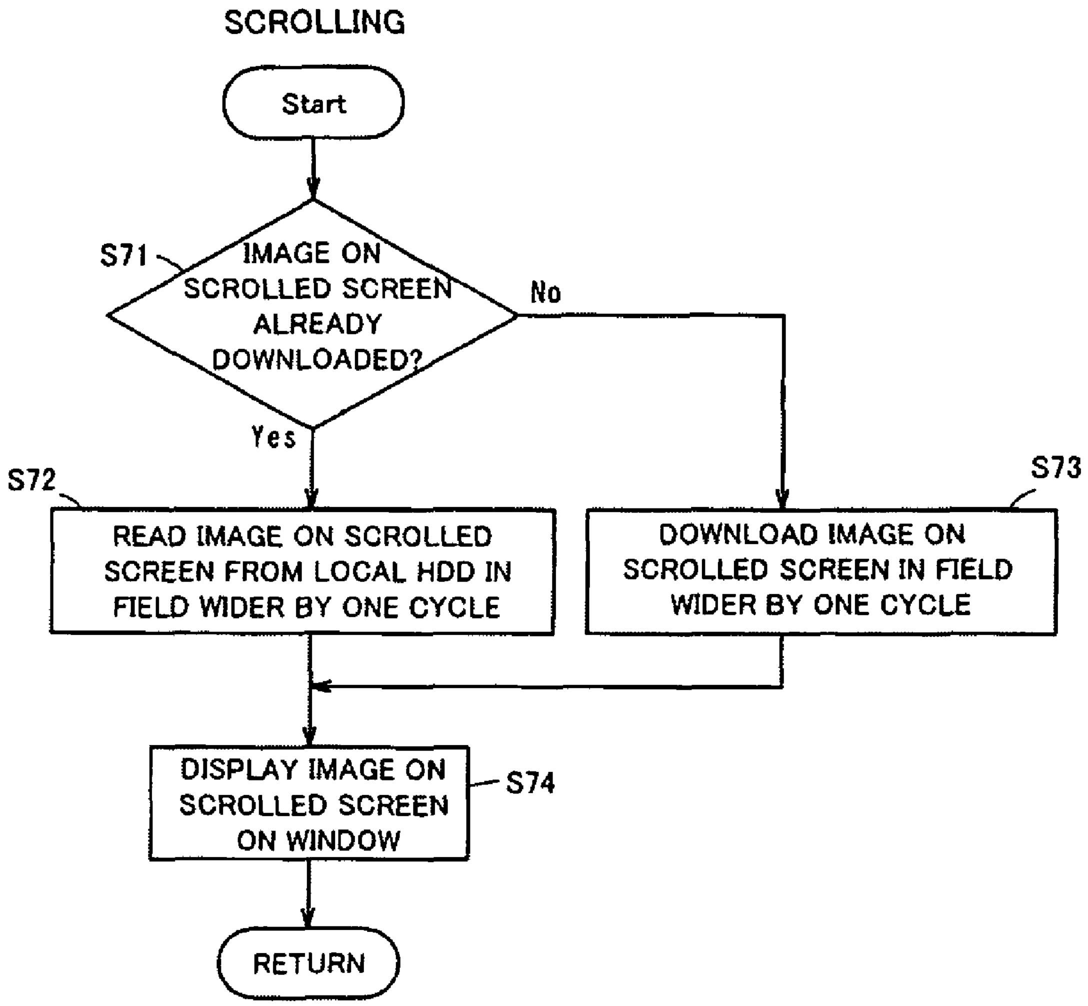

In order to perform scrolling at the step S37 in FIG. 10, the image creating apparatus 1 first determines whether or not the partial images 52*c* of 20 magnifications on the scrolled screen have already been downloaded to the client terminal 31 (see FIG. 1) at a step S71 in FIG. 12. When determining that the partial images 52*c* on the scrolled screen have already been downloaded to the client terminal 31, the image creating apparatus 1 reads the partial images 52*c* on the scrolled screen from the local HDD (not shown) of the client terminal 31 in a field wider by one cycle at a step S72. When determining that the partial images 52*c* on the scrolled screen have not yet been downloaded to the client terminal 31, on the other hand, the image creating apparatus 1 downloads the partial images 52*c* on the scrolled screen to the client terminal 31 in the field wider by one cycle at a step S73. Thus, the image creating apparatus 1 preferentially displays the partial images 52*c* of the specified field on the window of the client terminal 31 at a step S74. The image creating apparatus 1 also downloads the partial images 52*c* on the scrolled screen according to the same order as that for the aforementioned partial images 52*c* of 20 magnifications.

After completing the scrolling at the step S37 in FIG. 10 (steps S71 to S74 in FIG. 12), the image creating apparatus 1 advances to a step S38. The image creating apparatus 1 also advances to the step S38 when determining that no interruption for scrolling has been generated at the step S36 in FIG. 10.

At the step S38 in FIG. 10, the image creating apparatus 1 determines whether or not an interruption for display switching with respect to the depth direction (layer) of the cell has been generated by the user. When determining that the interruption for display switching with respect to the layer has been generated, the image creating apparatus 1 temporarily interrupts the download of the remaining partial images 52*c* of 20 magnifications. Then, the image creating apparatus 1 advances to a step S39, for performing layer switching preferentially to the download of the remaining partial images 52*c* of 20 magnifications in the background.

Figure 13:
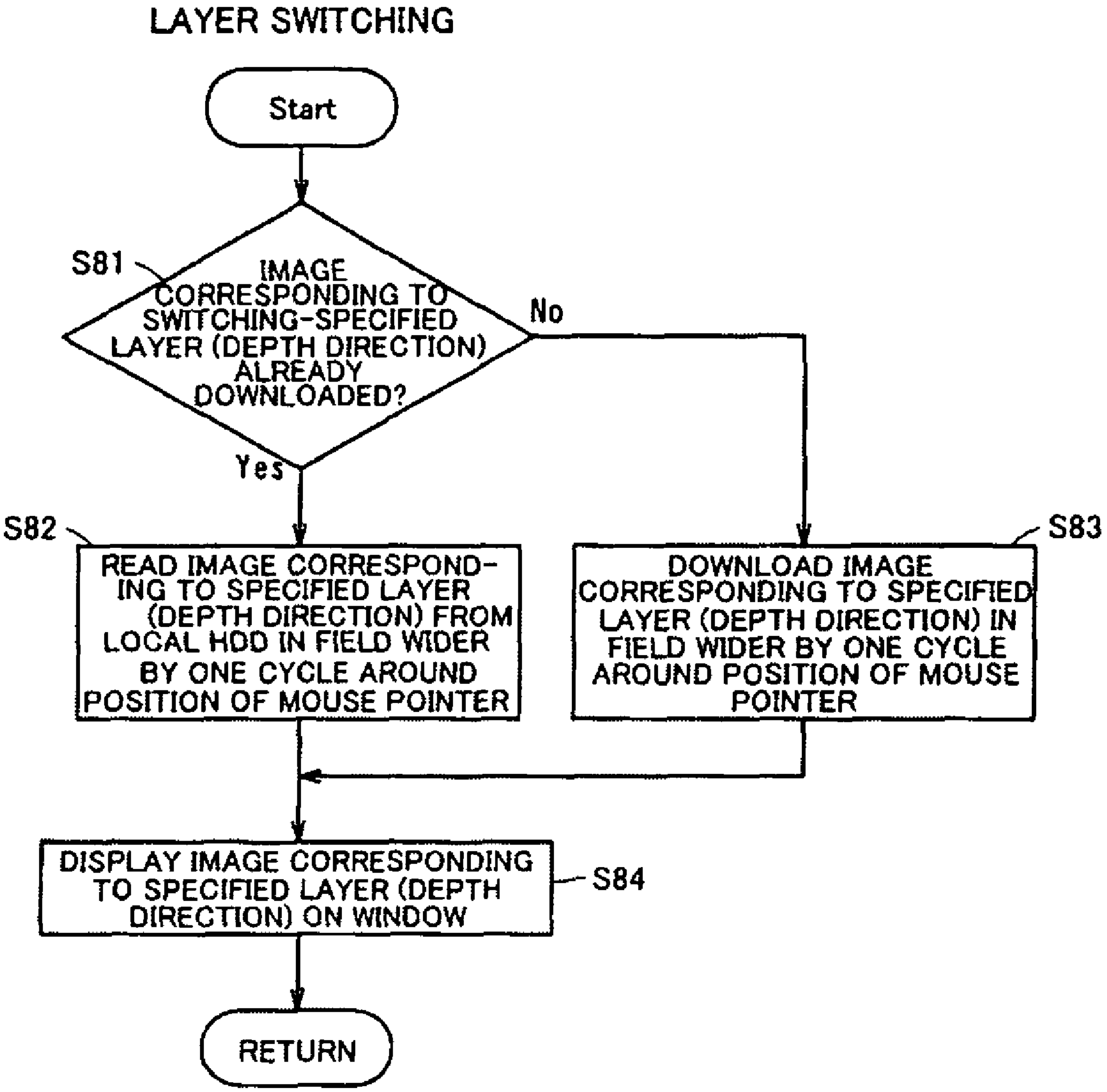

In order to perform the layer switching at the step S39 in FIG. 10, the image creating apparatus 1 first determines whether or not the partial images 52*c* of the switching-specified layer have already been downloaded to the client terminal 31 (see FIG. 1) at a step S81 in FIG. 13. When determining that the partial images 52*c* of the switching-specified layer have already been downloaded to the client terminal 31, the image creating apparatus 1 reads the partial images 52*c* of the specified layer from the local HDD (not shown) of the client terminal 31 in a field wider by one cycle around the position of the mouse pointer at a step S82. When determining that the partial images 52*c* of the switching-specified layer have not yet been downloaded to the client terminal 31, on the other hand, the image creating apparatus 1 downloads the partial images 52*c* of the specified layer to the client terminal 31 in the field wider by one cycle around the position of the mouse pointer at a step S83. Thus, the image creating apparatus 1 preferentially displays an image of an upper left portion of the virtual slide 52 of the specified layer on the window of the client terminal 31 at a step S84. The image creating apparatus 1 also downloads the partial images 52*c* of the specified layer according to the same order as that for the aforementioned partial images 52*c* of 20 magnifications.

After completing the layer switching at the step S39 in FIG. 10 (steps S81 to S84 in FIG. 13), the image creating apparatus 1 advances to a step S40. The image creating apparatus 1 also advances to the step S40 when determining that no interruption for display switching with respect to the layer has been generated at the step S38 in FIG. 10.

At the step S40 in FIG. 10, the image creating apparatus 1 determines whether or not all partial images 52*c* constituting the virtual slide 52 of 20 magnifications have been completely downloaded. When determining that not all partial images 52*c* constituting the virtual slide 52 of 20 magnifications have been completely downloaded, the image creating apparatus 1 returns to the step S33 for automatically downloading the remaining partial images 52*c* of 20 magnifications from the server 21 (see FIG. 1) in the background. The image creating apparatus 1 is so set as not to redundantly download the partial images 52*c* already downloaded to the client terminal 31 (see FIG. 1) due to already executed scrolling when restarting the processing of downloading the remaining partial images 52*c* of 20 magnifications in the background.

When determining that all partial images 52*c* constituting the virtual slide 52 of 20 magnifications have already been completely downloaded at the step S40 in FIG. 10, the image creating apparatus 1 advances to a step S41.

At the step S41 in FIG. 10, the image creating apparatus 1 downloads the remaining partial images 52*c* constituting the virtual slide 52 of 40 magnifications from the server 21 (see FIG. 1) in the background. The image creating apparatus 1 preserves the partial images 52*c* constituting the virtual slide 52 of 40 magnifications, downloaded from the server 21, in the local HDD (not shown) of the client terminal 31 (see FIG. 1). The image creating apparatus 1 is so set as not to redundantly download the partial images 52*c* already downloaded to the client terminal 31 (see FIG. 1) due to already executed magnification switching and scrolling when downloading the remaining partial images 52*c* of 40 magnifications in the background. The image creating apparatus 1 also downloads the remaining partial images 52*c* of 40 magnifications according to the same order as that for the aforementioned partial images 52*c* of 20 magnifications.

At a step S42 in FIG. 10, the image creating apparatus 1 determines whether or not an interruption for magnification switching has been generated by the user while downloading the remaining partial images 52*c* of 40 magnifications. When determining that the interruption for magnification switching has been generated, the image creating apparatus 1 temporarily interrupts the download of the remaining partial images 52*c* of 40 magnifications. Thereafter the image creating apparatus 1 advances to a step S43, for performing magnification switching similar to that described with reference to the step S35 (steps S61 to S64 in FIG. 11) preferentially to the download of the remaining partial images 52*c* of 40 magnifications.

When determining that no interruption for magnification switching has been generated at the step S42, on the other hand, the image creating apparatus 1 advances to a step S44.

At the step S44 in FIG. 10, the image creating apparatus 1 determines whether or not an interruption for scrolling has been generated by the user. When determining that the interruption for scrolling has been generated, the image creating apparatus 1 temporarily interrupts the download of the remaining partial images 52*c* of 40 magnifications. Then, the image creating apparatus 1 advances to a step S45, for performing scrolling similar to that described with reference to the step S37 (steps S71 to S74 in FIG. 12) preferentially to the download of the remaining partial images 52*c* of 40 magnifications. When determining that no interruption for scrolling has been generated at the step S44, on the other hand, the image creating apparatus 1 advances to a step S46.

At the step S46 in FIG. 10, the image creating apparatus 1 determines whether or not an interruption for display switching with respect to the depth direction (layer) of the cell has been generated by the user while downloading the remaining partial images 52*c* of 40 magnifications. When determining that the interruption for display switching with respect to the layer has been generated, the image creating apparatus 1 temporarily interrupts the download of the remaining partial images 52*c* of 40 magnifications. Thereafter the image creating apparatus 1 advances to a step S47, for performing layer switching similar to that described with reference to the step S39 (steps S81 to S84 in FIG. 13) preferentially to the download of the remaining partial images 52*c* of 40 magnifications. When determining that no interruption for display switching with respect to the layer has been generated at the step S46, on the other hand, the image creating apparatus 1 advances to a step S48.

At the step S48 in FIG. 10, the image creating apparatus 1 determines whether or not all partial images 52*c* constituting the virtual slide 52 of 40 magnifications have completely been downloaded. When determining that not all partial images 52*c* constituting the virtual slide 52 of 40 magnifications have completely been downloaded, the image creating apparatus 1 returns to the step S41 for automatically downloading the remaining partial images 52*c* of 40 magnifications from the server 21 (see FIG. 1) in the background.

When determining that all partial images 52*c* constituting the virtual slide 52 of 40 magnifications have completely been downloaded at the step S48 in FIG. 10, on the other hand, the image creating apparatus 1 advances to a step S49.

At the step S49 in FIG. 10, the image creating apparatus 1 downloads the remaining partial images 52*c* constituting the virtual slide 52 of 80 magnifications from the server 21 (see FIG. 1) in the background. The image creating apparatus 1 preserves the partial images 52*c* constituting the virtual slide 52 of 80 magnifications, downloaded from the server 21, in the local HDD (not shown) of the client terminal 31. The image creating apparatus 1 is so set as not to redundantly download the partial images 52*c* already downloaded to the client terminal 31 due to already executed magnification switching and scrolling when downloading the remaining partial images 52*c* of 80 magnifications in the background. The image creating apparatus 1 also downloads the remaining partial images 52*c* of 80 magnifications according to the same order as that for the aforementioned partial images 52*c* of 20 magnifications.

At a step S50 in FIG. 10, the image creating apparatus 1 determines whether or not an interruption for magnification switching has been generated by the user while downloading the remaining partial images 52*c* of 80 magnifications. When determining that the interruption for magnification switching has been generated, the image creating apparatus 1 temporarily interrupts the download of the remaining partial images 52*c* of 80 magnifications. Thereafter the image creating apparatus 1 advances to a step S51, for performing magnification switching similar to that described with reference to the step S35 (steps S61 to S64 in FIG. 11) preferentially to the download of the remaining partial images 52*c* of 80 magnifications. When determining that no interruption for magnification switching has been generated at the step S50, on the other hand, the image creating apparatus 1 advances to a step S52.

At the step S52 in FIG. 10, the image creating apparatus 1 determines whether or not an interruption for scrolling has been generated by the user. When determining that the interruption for scrolling has been generated, the image creating apparatus 1 temporarily interrupts the download of the remaining partial images 52*c* of 80 magnifications. Then, the image creating apparatus 1 advances to a step S53, for performing scrolling similar to that described with reference to the step S37 (steps S71 to S74 in FIG. 12) preferentially to the download of the remaining partial images 52*c* of 80 magnifications. When determining that no interruption for scrolling has been generated at the step S52, on the other hand, the image creating apparatus 1 advances to a step S54.

At the step S54 in FIG. 10, the image creating apparatus 1 determines whether or not an interruption for display switching with respect to the depth direction (layer) of the cell has been generated by the user while downloading the remaining partial images 52*c* of 80 magnifications. When determining that the interruption for display switching with respect to the layer has been generated, the image creating apparatus 1 temporarily interrupts the download of the remaining partial images 52*c* of 80 magnifications. Thereafter the image creating apparatus 1 advances to a step S55, for performing layer switching similar to that described with reference to the step S39 (steps S81 to S84 in FIG. 13) preferentially to the download of the remaining partial images 52*c* of 80 magnifications. When determining that no interruption for display switching with respect to the layer has been generated at the step S54, the image creating apparatus 1 advances to a step S56.

At the step S56, the image creating apparatus 1 determines whether or not all partial images 52*c* constituting the virtual slide 52 of 80 magnifications have completely been downloaded. When determining that not all partial images 52*c* constituting the virtual slides 52 of 80 magnifications have completely been downloaded, the image creating apparatus 1 returns to the step S49 for automatically downloading the remaining partial images 52*c* of 80 magnifications from the server 21 (see FIG. 1) in the background.

When the image creating apparatus 1 determines that all partial images 52*c* constituting the virtual slide 52 of 80 magnifications have completely been downloaded at the step S56 in FIG. 10, on the other hand, this means that the image creating apparatus 1 has completed the download of all partial images 52*c* of 20, 40 and 80 magnifications from the server 21 (see FIG. 1) to the client terminal 31 (see FIG. 1).

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment of the present invention is applied to the image creating apparatus for creating blood cell images, the present invention is not restricted to this but is also applicable to another image creating apparatus creating images of a cell other than the blood cell.

While the image creating apparatus according to the aforementioned embodiment classifies the plurality of images picked up on the plurality of different depth-directional positions of the blood cell respectively into the three depth ranges (upper, intermediate and lower layers), the present invention is not restricted to this but the plurality of images picked up on the plurality of different depth-directional positions of the blood cell respectively may simply be classified into a plurality of depth ranges of a number exceeding that of cell structures.

While the image creating apparatus according to the aforementioned embodiment so classifies the plurality of images picked up on the plurality of different depth-directional positions of the blood cell respectively as to include the images overlapping between the adjacent layers (between the upper and intermediate layers and between the intermediate and lower layers), the present invention is not restricted to this but the plurality of images picked up on the plurality of different depth-directional positions of the blood cell respectively may alternatively be classified to include no images overlapping between the adjacent layers.

While the image creating apparatus according to the aforementioned embodiment picks up the images of the blood cell on different focal positions with the image pickup portion having no automatic focusing portion, the present invention is not restricted to this but the image creating apparatus may alternatively employ an image pickup portion including an automatic focusing portion focusing a point of an object including a cell for deciding a plurality of depth ranges on the basis of a focal position obtained by the automatic focusing portion. According to this structure, the image creating apparatus, automatically focusing a proper focal position in the object for deciding proper depth ranges from the focal position, can efficiently create focus-synthesized images without requiring the user to manually focus the focal position or without setting excessively wide depth ranges for reliably bringing the object into the focal position, for example.

While the image creating apparatus according to the aforementioned embodiment creates the virtual slides every layers (upper, intermediate and lower layers) at the 20, 40 and 80 magnifications respectively, the present invention is not restricted to this but the image creating apparatus may alternatively create virtual slides every layers (upper, intermediate and lower layers) at a prescribed magnification while creating a virtual slide corresponding to only one of the upper, intermediate and lower layers at a magnification other than the prescribed one, or may alternatively perform focus synthesis once as to the overall depth-directional image pickup range including the upper, intermediate and lower layers for creating a virtual slide in focus over the entire depth-directional image pickup range at the magnification other than the prescribed one. For example, the image creating apparatus may create virtual slides every layers (upper, intermediate and lower layers) at the maximum 80 magnifications while creating virtual slides corresponding to only one of the upper, intermediate and lower layers at the 20 and 40 magnifications, or may perform focus synthesis once as to the overall depth-directional image pickup range at the 20 and 40 magnifications for creating a single virtual slide in focus over the entire depth-directional image pickup range.

What is claimed is:

1. An image creating apparatus comprising:

an image pickup portion configured for picking up a plurality of images of a cell on different focal positions; and an image synthesizing portion configured for:

classifying the plurality of images picked up by the image pickup portion into a plurality of depth ranges as to focal direction, wherein the plurality of depth ranges comprises a first depth range and a second depth range, a plurality of first images among the plurality of images belong to the first depth range, and a plurality of second images among the plurality of images belong to the second depth range;

synthesizing the plurality of first images belonging to the first depth range by selecting pixels with a higher contrast from the plurality of first images, wherein the selected pixels from the first images are combined; and synthesizing the plurality of second images belonging to the second depth range by selecting pixels with a higher contrast from the plurality of second images, wherein the selected pixels from the second images are combined;

whereby a first two-dimensional focus-synthesized image is created in focus over the first depth range based on the synthesis of the first images and a second two-dimensional focus-synthesized image is created in focus over the second depth range based on the synthesis of the second images.

2. The image creating apparatus of claim 1, wherein the image pickup portion comprises a lens portion for enlarging images of the cell, a pickup portion for picking up the enlarged images of the cell, and a focal position varying portion for varying the focal position of the lens portion.

3. The image creating apparatus of claim 1, wherein the selection of pixels based on contrast comprises selecting pixels having the highest contrast from among the pixels.

4. The image creating apparatus of claim 1, wherein at least one of the plurality of images belongs to both the first depth range and the second depth range.

5. The image creating apparatus of claim 1, wherein the image pickup portion comprises an automatic focusing portion focusing a point in an object including the cell, and wherein the first depth range and the second depth range are decided based on a focal position focused by the automatic focusing portion.

6. The image creating apparatus of claim 1, wherein the image synthesizing portion partially overlaps the first focus-synthesized image on another first focus-synthesized image.

7. The image creating apparatus of claim 1, wherein the cell comprises a plurality of cell structures, and wherein the first and the second two-dimensional focus-synthesized images are created to be substantially in focus with respect to the plurality of cell structures respectively.

8. The image creating apparatus of claim 1, wherein the cell comprises a blood cell.

9. An image creating method comprising:

picking up, by an image creating apparatus, a plurality of images of a cell on different focal positions;

classifying, by the image creating apparatus, the plurality of images into a plurality of depth ranges as to focal direction, wherein the plurality of depth ranges comprises a first depth range and a second depth range, further wherein a plurality of first images among the plurality of images belonging to the first depth range, and a plurality of second images among the plurality of images belonging to the second depth range;

synthesizing, by the image creating apparatus, the plurality of images belonging to the first depth range by selecting pixels having the highest contrast from among pixels in the plurality of images belonging to the first depth range;

synthesizing, by the image creating apparatus, the plurality of images belonging to the second depth range by selecting pixels having the highest contrast from among pixels in the plurality of images belonging to the second depth range; and creating, by the image creating apparatus with the selected pixels, a first two-dimensional focus-synthesized image in focus over the first depth range and a second two-dimensional focus-synthesized image in focus over the second depth range.

10. The image creating method of claim 9, wherein the synthesis further comprises combining the selected pixels.

11. The image creating method of claim 10, wherein at least one of the plurality of images belongs to both the first depth range and the second depth range.

12. The image creating method of claim 9, wherein the picking comprises focusing a point in an object including the cell, and wherein the first depth range and the second depth range are decided based on a focal position focused automatically.

13. The image creating method of claim 9, further comprising partially overlapping the first focus-synthesized image on another first focus-synthesized image.

14. The image creating method of claim 9, wherein the cell comprises a plurality of cell structures, and the wherein the first and the second two-dimensional focus-synthesized images are created to be substantially in focus with respect to the plurality of cell structures respectively.

15. The image creating method of claim 14, wherein the cell comprises a blood cell.

16. An image creating method comprising:

generating a plurality of images of a cell at different focal positions;

classifying the plurality of images into a plurality of depth ranges by the focal directions, where a plurality of first images among the plurality of images belong to a first depth range, and a plurality of second images among the plurality of images belong to a second depth range;

synthesizing the plurality of first images belonging to the first depth range by selecting pixels with a higher contrast from the plurality of first images, wherein the selected pixels with the higher contrast from the first images are combined;

synthesizing the plurality of second images belonging to the second depth range by selecting pixels with a higher contrast from the plurality of second images, wherein the selected pixels with the higher contrast from the second images are combined; and creating a first two-dimensional focus-synthesized image in focus over the first depth range based on the synthesis of the first images and a second two-dimensional focus-synthesized image in focus over the second depth range based on the synthesis of the second images through a computer processor;

where the plurality of depth ranges comprises the first depth range and the second depth range.

* * * * *